No. 705,589. Patented July 29, 1902.
A. JAMES.
APPARATUS FOR PRECIPITATING GOLD AND SILVER FROM THEIR SOLUTIONS.
(Application filed Mar. 19, 1900.)
(No Model.)

WITNESSES
S. M. McColl.
E. J. Clarkson.

INVENTOR
Alfred James,
By J. C. Somes,
Attorney.

THE NORRIS PETERS CO., PHOTO-LITHO., WASHINGTON, D. C.

UNITED STATES PATENT OFFICE.

ALFRED JAMES, OF LONDON, ENGLAND.

APPARATUS FOR PRECIPITATING GOLD AND SILVER FROM THEIR SOLUTIONS.

SPECIFICATION forming part of Letters Patent No. 705,589, dated July 29, 1902.

Application filed March 19, 1900. Serial No. 9,258. (No model.)

*To all whom it may concern:*

Be it known that I, ALFRED JAMES, a subject of the Queen of Great Britain, residing at 56 New Broad street, London, in the county of Middlesex, England, have invented new and useful Improvements in Metallurgical Filters, (for which I have made application for patents in Great Britain, No. 269, dated January 4, 1900; No. 3,421, dated February 21, 1900, and No. 3,713, dated February 26, 1900,) of which the following is a specification.

In the precipitation of gold and silver from cyanid and other solutions zinc is usually employed as a precipitant, and the use of iron vessels containing the solutions has been found objectionable, because the iron being electronegative to zinc a galvanic action is set up between the vessel and the zinc, which causes the precious metal to be deposited upon the vessel instead of upon the precipitant. Owing to this difficulty the general practice has been to use vessels constructed of wood or earthenware, which are inconvenient and do not facilitate the cleaning-up operation.

The object of this invention is to avoid these objections.

To this end the invention consists in a metallurgical filter for separating precious metal from a solution containing it, consisting of a metallic vessel and a zinc sponge disposed therein, said vessel having an inner coating of enamel, whereby galvanic action between the metallic vessel and the zinc is prevented and deposit of precious metal on the vessel avoided.

The invention also consists in certain details of construction hereinafter set forth and claimed.

Figure 1:
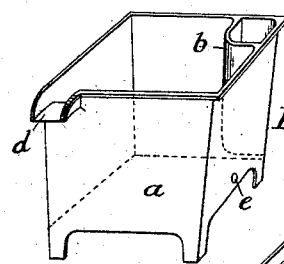
Figure 2:
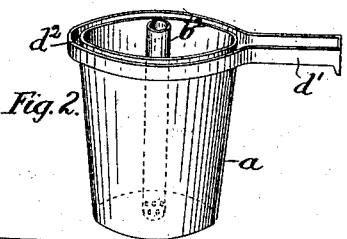
Figure 3:
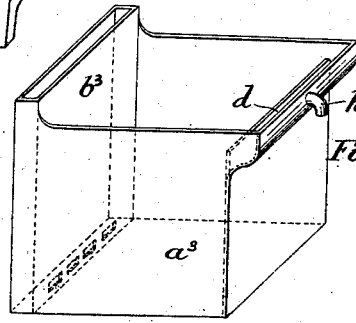
Figure 4:
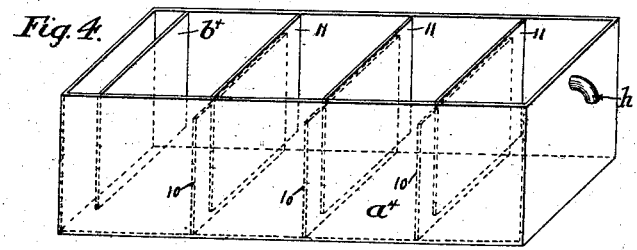
Figure 5:
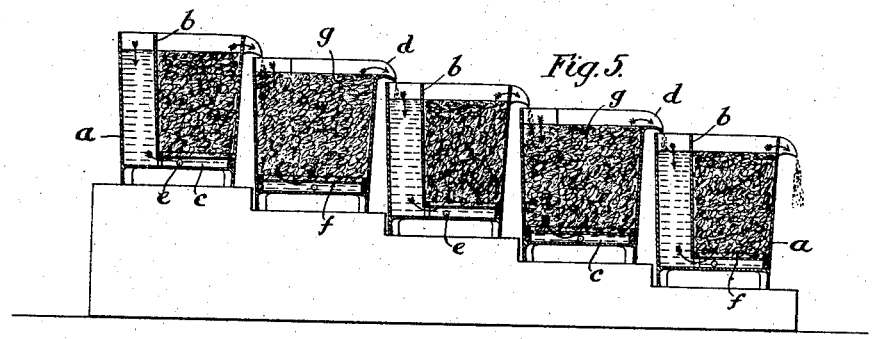
Figure 6:
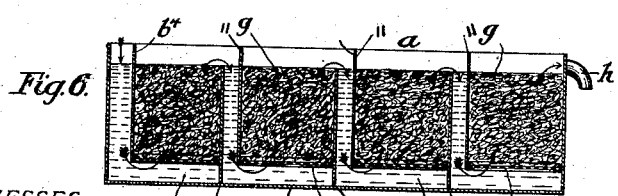

Figure 1 of the accompanying drawings represents a perspective view of one form of vessel forming a part of this improved filter. Fig. 2 represents a perspective view of another form thereof. Fig. 3 represents a perspective view of another form thereof. Fig. 4 represents a perspective view of a vessel constituting a part of this improved filter provided with a series of successive filtering-chambers. Fig. 5 represents a longitudinal vertical section of a filter of this character comprising a series of vessels corresponding to that represented in Fig. 1 arranged one above the other, so that the solution may pass from one vessel to the next in succession without pipe connections. Fig. 6 represents a vertical longitudinal section of a metallurgical filter constructed according to this invention and comprising a vessel similar to that illustrated in Fig. 4.

Similar letters and figures of reference indicate the same parts in all the figures.

This metallurgical filter comprises a vessel for containing the cyanid or other solution containing the precious metal to be precipitated and a zinc sponge adapted to serve as the precipitant. The vessel is composed of iron or other suitable metal provided with an inner lining of enamel, which insulates the zinc from the iron of the structure and prevents galvanic action between said metals.

In Fig. 1 the metallic vessel $a$ is shown as rectangular in form, constructed with its bottom and sides in one integral piece, and it is provided with a partition which extends from at or near the top of the vessel to near the bottom thereof and forms an inlet-channel for the entrance of the solution and with an outlet $d$ at its top preferably in the form of a spout. The zinc sponge, which is composed of zinc in any suitable finely-divided state, is disposed in this vessel, and the solution passing downward through the channel $b$ enters the vessel near the bottom thereof, rises through the mass of zinc, depositing the precious metal thereon, and then flows off through the outlet $d$. The vessel may be provided with an opening adapted to be closed by a plug or cork for the purpose of aiding the removal of the precipitated metals. The inlet $b$ and outlet $d$ are preferably disposed at diagonally opposite corners of the tank.

In Fig. 2 the enameled vessel $a$, constituting a part of the metallurgical filter, is represented as cylindrical in form. The inlet-channel $b^2$ is in the form of a central tube extending from the bottom of the vessel to the top thereof and provided with lateral perforations near its bottom for discharging the solution into the vessel. The outlet is in the form of an annular channel $d^2$, surrounding the top of the vessel and provided with a lateral extension $d'$ for delivering the solution into the inlet of the next succeeding vessel when a number of the vessels are arranged in series.

In Fig. 3 the containing vessel $a^3$ is shown in rectangular form, provided with an inlet-channel $b^3$, which extends across one whole side of the vessel and above the top thereof, the inner wall of the channel being provided with perforations 3 near the bottom of the vessel.

Figs. 4 and 6 show an elongated enameled iron vessel $a^4$, divided into a series of successive filtering-chambers, each designed to contain zinc in a finely-divided state. This vessel is provided at one end with an inlet-channel $b^4$, which extends from the top to near the bottom of the vessel, and each of the several compartments is separated from the adjacent compartment by two partitions 10 and 11, which form a channel for conveying the solution from one compartment into the successive compartment. The partition 10 extends from the bottom of the tank to a point near the top thereof, and the partition 11 extends from the top of the tank to a point near the bottom thereof, so that the solution flows from one compartment over the top of the partition 10, down between the two partitions, and under the bottom of the partition 11 into the succeeding compartment. These partitions are also enameled. The final compartment may be provided with an outlet $h$, through which the solution passes into another vessel or other point of discharge.

In the form shown in Fig. 5, which comprises a series of enameled iron tanks similar in form to that illustrated in Fig. 1, the precipitation-compartment is provided with a perforated false bottom $f$, disposed above the inlet-opening and supporting the zinc. This false bottom is also enameled, and it is preferably composed of thin sheet-iron provided with holes punched therein and having a coating of enamel disposed on both sides thereof, whereby galvanic action is prevented and the deposit of the precious metal on the false bottom avoided. The sheet-iron gives stability to the false bottom and prevents cracking of the enamel, as might occur if the bottom were composed of enameled wire.

The several vessels $a$ comprising the filter of Fig. 5 are preferably constructed with their inlets and outlets arranged alternately in different positions—that is to say, the alternate vessels would have the inlet-channel at the right-hand corner and the outlet at the left-hand corner and the intermediate vessels the inlet-channel at the left-hand corner and the outlet at the right-hand corner, so that the outlet of one will discharge into the inlet of the next adjoining vessel.

I claim as my invention—

1. A metallurgical filter for separating precious metal from a solution containing said metal consisting of an iron vessel cast in one piece having an integral partition at one end thereof extending to a point near the bottom, said vessel and partition being provided with an inner coating of enamel, an extension at the top of said vessel opposite said partition forming a chamber, and a spout leading from said chamber.

2. A metallurgical filter for separating precious metal from a solution containing said metal consisting of an iron vessel cast in one piece and having an integral partition extending to a point near the bottom thereof, said vessel and partition being provided with an inner coating of enamel, said vessel being widened at one side near the top thereof and having an integral partition extending upward from said vessel and forming a chamber, said partition being lower than the tank and permitting the liquid to flow over the top thereof into said chamber, and a spout leading from said chamber.

ALFRED JAMES.

Witnesses:
WILLIAM G. ELDER,
CECIL H. BETTENSON.